United States Patent Office

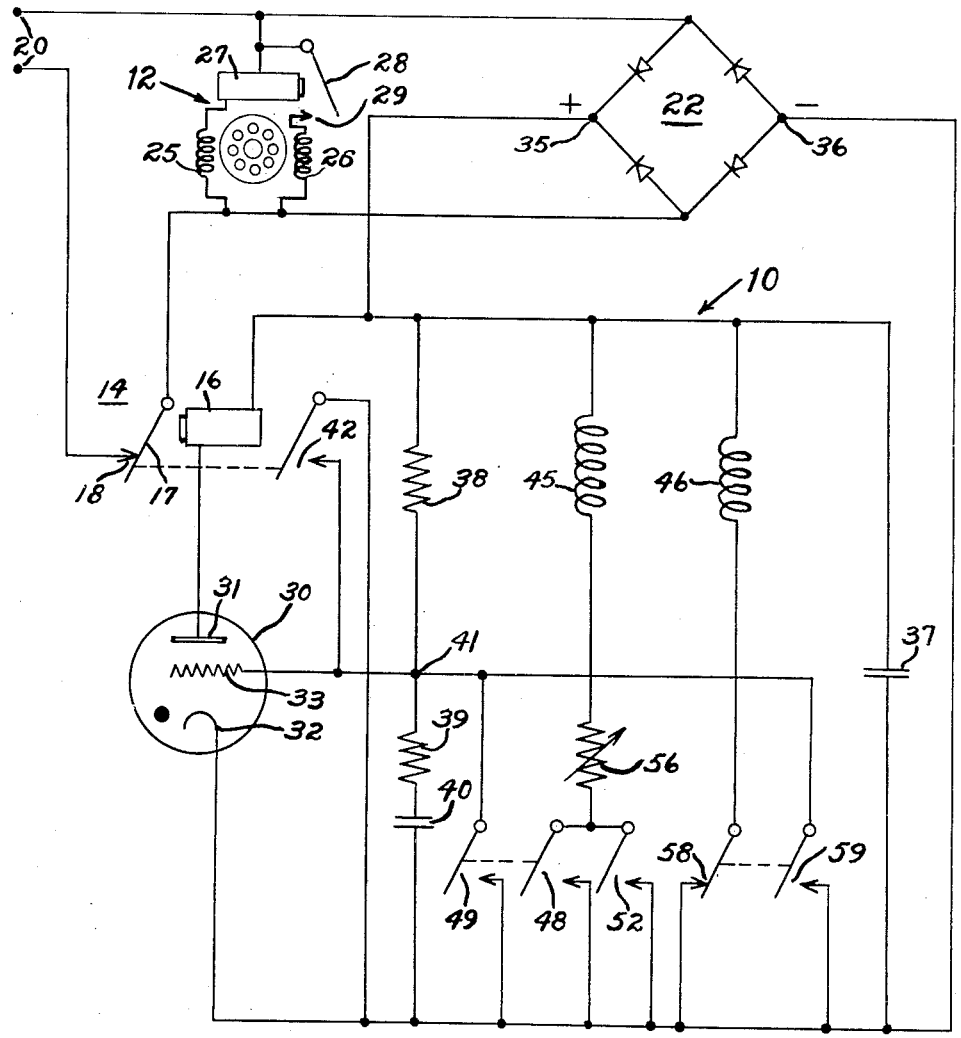

2,840,204
Patented June 24, 1958

2,840,204
TIME DELAY DEVICE

Flavius A. Mathamel, Allen Park, and John L. Emery, Oak Park, Mich., assignors to Burroughs Corporation, Detroit, Mich., a corporation of Michigan Application January 14, 1954, Serial No. 404,116

10 Claims. (Cl. 192—.02)

The present invention relates generally to time delay circuits and more particularly to a time delay circuit adapted to disconnect an electric load device from its source of power when an instrumentality with which the device is associated has remained idle for a predetermined period of time.

It is often desirable to have available means for automatically deenergizing load devices such as continuously running motors or stand-by power sources of some kind or another after the machine or equipment with which they are used has been idle or in a certain condition for a predetermined period of time. A considerable amount of power may be lost and a substantial amount of wear may result because of failure on the part of an operator to turn motors or other power consuming devices off when he is not using the machine with which they are associated. It has been proposed in the past to provide a pressure actuated switch which is normally closed when the operator occupies his normal working position at the machine but which will automatically open to deenergize the motor or other power consuming device when he leaves the machine. This, however, has the disadvantage that the operator must always occupy a certain position in order to maintain the machine energized and if he should be occupied in a task in which the machine is not being used but while occupying the position in which the switch is closed the machine will remain energized. It is, therefore, contemplated by the present invention to provide means particularly useful with machines of this type which will automatically turn one or more power consuming devices off after the machine has been idle or in one or more conditions for a predetermined period of time.

Accordingly, one object of the present invention is to provide a novel, simple and effective device for interrupting an electrical circuit feeding a motor or other power consuming device after the machine with which the motor or other power consuming device is associated has been idle for a predetermined period of time.

Another object is to provide a novel, self-deenergizing time delay circuit, adapted to open a power circuit to deenergize loads connected thereto when certain predetermined conditions have persisted for a predetermined period of time in a device with which the loads are associated.

A still further object is to provide a self-deenergizing time delay circuit in which the timing cycle is suspended under certain conditions of a machine with which it is associated but which will automatically deenergize a power consuming load when certain other conditions of the machine have persisted for a predetermined time.

A still further object is to provide a novel, self-deenergizing time delay circuit which automatically resets its timing cycle when it operates so as to permit substantially immediate subsequent energization thereof and of electrical circuits controlled thereby.

A still further object is to provide a novel self-deenergizing time delay circuit that requires substantially no power to maintain energized.

A still further object is to provide a novel, self-deenergizing time delay circuit for controlling a power circuit feeding power-consuming devices, the timing cycle of which may be controlled by a substantially unlimited number of instrumentalities the operation of any one of which will reset the timing cycle and disable the time delay circuit from functioning for the time such instrumentality remains operated.

These and other objects and advantages will be apparent from the following description of a specific embodiment of my invention illustrated by way of example in the single figure of the accompanying drawing.

In the drawing, the timing circuit of my invention is generally indicated at 10 and is illustrated as controlling the operation of a load device generally indicated at 12 by controlling the operation of a power switch 14 by means of a current responsive relay 16. The relay 16 is shown in its deenergized condition, and the switch 14 is shown in closed position wherein the movable contact arm 17 of the switch is in engagement with the back contact 18 which is connected to one of a pair of power input terminals 20. When the switch 14 is in the position shown in the drawing, a circuit is completed to connect the load device 12 and a full wave rectifier bridge circuit 22 across the power terminals 20. The full wave rectifier 22 is provided for the purpose of supplying D. C. power to the timing circuit of our invention as well as to certain other instrumentalities which will be described later. The load device 12 is illustrated as being an alternating current motor having an operating winding 25 and a starting winding 26, and provided with a starting relay 27 whose energizing winding is connected in series with the operating winding 25. The arrangement is such that the relay 27 becomes energized to move switch arm 28 against front contact 29 and thereby energize the starting winding when the power is first applied to the motor and remains in this condition until the motor attains nearly operating speed.

The relay 16 which is controlled by the timing circuit 10 is shown as being connected in the anode circuit of a gaseous discharge device 30 having an anode 31, a cathode 32, and a control electrode or grid 33. The discharge device 30 may be of a type generally referred to as a thyratron. The winding of relay 16 is connected between the positive terminal 35 of the rectifier bridge 22 and the anode 31 of the discharge device 30 whose cathode 32 is connected to the negative terminal 36 of the rectifier bridge. A filter 37 is connected across the positive terminal 35 and the negative terminal 36 of the rectifier bridge in order to reduce the A. C. ripple on the rectified D. C. voltage.

Also connected across terminals 35 and 36 of the rectifier is a resistance-capacitance timing circuit shown as being made up of a charging resistor 38, current limiting discharge resistor 39 and a capacitor 40. The values of the charging resistor 38 and the capacitor 40 will determine the time delay of the timing circuit, the resistance value of resistor 39 being insignificant as compared with the value of the resistor 38. The control grid 33 of the discharge device 30 is connected to the juncture 41 between resistors 38 and 39.

In order to discharge the capacitor whenever relay 16 operates to break the power circuit by opening the switch 14, we provide a switch 42 ganged to switch 14 so as to close when switch 14 opens and vice versa. Switch 42 will, when closed, establish a short circuit across capacitor 40 and resistor 39 to provide a discharge path for the capacitor through the current-limiting discharge resistor.

Inductances 45 and 46 represent D. C. load devices provided in a machine with which the timing circuit of our invention is utilized and which may be selectively energized by an operator. The inductance 45 may, for example, represent a magnetic clutch for connecting, when energized, the output of the motor 12 to some normally idle operating part in the machine. The clutch 45 may be energized either by closing a switch 48 ganged to a second switch 49 or by closing a switch 52 to complete a circuit across the terminals 35 and 36 of the rectifier bridge 22. When the clutch 45 is energized by closing switch 48, switch 49 will also be closed to establish a discharge path for the timing capacitor 40 through the discharge resistor 39, while when the clutch 45 is energized by closing the switch 52 no discharge path is provided for the timing capacitor and the charging of the latter will continue uninterrupted. A variable resistor 56 is provided for the purpose of controlling the current flow through the magnetic clutch 45.

The inductance 46 may represent a load device such as a magnetic clutch which is normally energized but which may be deenergized by operating a switch 58 ganged to a second switch 59 in opposed relation. When the switch 58 is opened to deenergize the inductive load 46, switch 59 will be closed to provide a discharge path for the capacitor 40 through discharge resistor 39.

The power switch 14 is preferably of a type that will remain stable in both its open and closed positions and which may be operated manually to either position but by the operation of the relay 16 only from closed to open position. Thus, for example, the switch 14 may be a conventional toggle type switch having a handle for manual operation and an over-center spring device for maintaining the switch in either "on" or "off" condition with a proper mechanical connection to the clapper of the relay 16.

The operation of the timing circuit in accordance with our invention will now be described, assuming that the discharge device 30 is extinguished and that the switches are in the positions shown, that the capacitor 40 is completely discharged and that motor 12 is running at normal operating speed. Under these assumptions, the magnetic load device 46 will be energized and the magnetic device 45 will be deenergized and a charging current for capacitor 40 will be flowing through the resistances 38 and 39. Due to the high initial charging current of the capacitor 40 through the resistances 38 and 39, the voltage drop across these resistances will initially be substantially equal to the voltage across the terminals 35 and 36 of the rectifier 22. The resistor 38 is very large as compared with the resistor 39 so that substantially the total voltage drop due to the charging current appears across the resistor 38. The control grid 33 of the electron discharge device 30 will therefore initially be at a potential only slightly more positive than that of the cathode 32 and the discharge device will therefore remain in an extinguished or non-conducting condition. As the current continues to flow into the capacitor 40, a charge will be built up therein which will gradually reduce the current flowing through the resistors 38 and 39. The voltage across the plates of capacitor 40, due to this accumulated charge, will increase exponentially with time toward the potential of terminal 35 as the limit. Because of the small voltage across the resistance 39 as compared with the voltage across resistance 38, the voltage between the grid 33 and the cathode 32 may for all practical purposes be considered to be equal to the voltage across the capacitor 40. Depending on the particular characteristics of the gas discharge device 30 and the potential of the D. C. voltage applied thereto from rectifier unit 22, the device will fire (i. e. break down and conduct current) when the grid 33 reaches a certain predetermined potential with respect to the cathode 32. Thus, for example, if the gaseous discharge device 30 is a cold cathode thyratron tube of the kind distributed under type No. 5823 by the Radio Corporation of America, and if the voltage applied across the plate and cathode of the thyratron is approximately 150 volts, the tube will fire or break down when the grid 33 is approximately 90 volts positive with respect to the cathode. When the thyratron fires, a relatively large amount of current will suddenly flow through the operating windings of relay 16 to cause the latter to operate and thereby open switch 14 and close switch 42. This will, of course, result in the deenergization of motor 12 and the rectifier 22 which supplies the D. C. potential to the timing circuit and will also establish a discharge circuit for capacitor 40 through discharge resistor 39 and closed switch 42.

It was mentioned above that switch 14 is of an over-center type and will remain in its open position until positively actuated with a force substantially greater than that of the restoring biasing force applied to the clapper element of the relay. Subsequent deenergization of the relay 16 will, therefore, have no effect upon the ganged switches 14 and 42. The power switch 14 will therefore remain open and the capacitor 40 will remain discharged by the discharge path established by the closed switch 42 until the switches 14 and 42 are again manually operated to the positions shown in the drawing. This arrangement will ensure that the timing cycle always starts from zero time no matter how short or long a time the switches 14 and 42 remain in these positions. It will thus be appreciated that the relay 16 will always completely discharge the timing capacitor 40 when it operates, so that whenever the machine with which the timing circuit is utilized is placed into operation, and the switches 14 and 42 are operated to closed and open positions, respectively, the timing circuit will start its timing cycle from its zero position to provide a full initial delay period.

Assume now that at some time after the switch 14 has been closed but before sufficient time has elapsed to permit the charge on the capacitor 40 to be built up to a point where the thyratron will fire, the operator closes the ganged switches 48 and 49 to energize the magnetic clutch 45 in order to connect an operating part of the machine to the continuously running motor 12. The closed switch 49 will establish a discharge path across the capacitor and as long as this switch remains closed, the capacitor 40 will remain in a completely discharged condition. When the operator again opens switches 48 and 49 to deenergize the magnetic clutch 45, the discharge path through the switch 48 will be interrupted and the timing cycle will again be permitted to commence. Assume now that the operator operates the ganged switches 58 and 59 to deenergize the magnetic device 46. This will provide a discharge path for the capacitor 40 through the closed switch 59 which will maintain the capacitor discharged as long as the magnetic device 46 is maintained deenergized. When the operator again moves the ganged switches 58 and 59 to the positions shown in the drawing, the timing cycle will again be permitted to begin.

It will be evident to those skilled in the art that switches similar to switches 48, 49 and 58, 59 may be provided in the circuits of other operating parts of the machine to reset the timing cycle to zero whenever one or more of such parts are operated or released, as the case may be and to suspend the operation of the time delay circuit for the period such part or parts remain operated or released. If desired, an arrangement similar to that shown in connection with the magnetic device 45 may be provided for the magnetic device 46 and other devices of the machine whereby the devices may be energized, for example, by closing a switch 52 without thereby resetting the timing cycle and without suspending the operation of the timing circuit.

The delay device in accordance with our invention may therefore be employed with various types of machines to deenergize electric power consuming loads such as, for example, continuously running motors if certain operating parts of such machines have not been actuated within a predetermined period of time. The elapsed time of the delay depends, of course, on the time constant of the RC time delay circuit consisting of resistance 38 and capacitor 40. If a thyratron of the type referred to above is used and if it is operated with a potential of approximately 150 volts across the terminals 35 and 36 of the rectifier 22, a resistor 38 having a resistance of 132 megohms and a capacitor 40 having a capacitance of 2 microfarads will produce a time delay of approximately 5 minutes. This time delay may, of course, be increased or decreased by increasing or decreasing the value of either resistance 38 or capacitor 40 or both. The number of devices that may be used in conjunction with our delay device is practically unlimited.

An important aspect of our invention is the fact that the delay device consumes very little power and that the timing circuit, when operated, disconnects itself as well as the electric loads controlled thereby from the power source so that no power will be consumed after it has operated.

Another important feature of our invention is that whenever the timing circuit operates, it immediately resets itself to zero so that there will be no waiting period necessary before the device may again be put into operation. In the absence of the automatic bypass for capacitance 40 provided by switch 42, some charge would be left on the capacitor with the result that a shortened time period would initially be available to the operator to operate some part of the machine before the timing circuit would again deenergize the driving motor 12.

Although only a specific embodiment of our invention has been described and illustrated herein, it will be apparent to those skilled in the art that various modifications and alterations may be made therein and that various ways of controlling the operation of the time delay device in accordance with our invention by operating parts of an associated machine or of some other machine may be employed without departing from the true scope of our invention.

We claim:

1. In combination, an electric motor, a self-deenergizing control device for controlling energization of said motor comprising an electrical charging circuit having a predetermined charging rate, switch means connecting said charging circuit and said motor to a source of electric power, current responsive switch operating means operatively connected to said switch means, a current controlling device including a control electrode connected in circuit with said current responsive switch operating means, said current controlling device limiting the current flow through said current responsive means to a value insufficient to cause operation thereof when said control electrode is at a potential lower than a given value but permitting a current flow through said current responsive means that will cause the latter to operate to open said switch means when said control electrode is at a potential above said given value, said charging circuit being connected to said control electrode of said current controlling device to apply a voltage to said control electrode that increases as a function of time to actuate said current responsive means a given period of time after the beginning of the charging of said charging circuit to operate said switch means and thereby deenergize said charging circuit and said motor, electrically energizable clutch means for coupling said motor to a load, and further switch means for controlling the operation of said clutch means, said last named switch means including contacts operable therewith for resetting the timing cycle of said charging circuit to zero time and for disabling said charging circuit for the period of time said last named switch means remains operated.

2. A self-deenergizing control device for controlling the energization of an electrical load circuit comprising a time delay circuit having a predetermined timing cycle, a power switch, electrically energized power switch operating means, said power switch connecting, when closed, said time delay circuit and said switch operating means to a source of energizing power, said power switch operating means including a control element, said time delay circuit being connected to said control element to apply an operating potential thereto to cause said switch operating means to operate a predetermined period of time from the beginning of the timing cycle thereof to open said power switch and deenergize, said time delay circuit and said switch operating means, a normally deenergized electric circuit, a normally open switch for energizing said electric circuit, said last named switch including contact means operable therewith for resetting said time delay circuit to zero time when said normally open switch is closed and for disabling the timing operation of said delay circuit for the time period said normally open switch remains closed, a normally energized electric circuit, and a normally closed switch for controlling said normally energized electric circuit, a normally open switch ganged to said last named switch and operable therewith for resetting said time delay circuit to zero when said normally closed switch is opened and for disabling the timing operation of said delay circuit for the time period said normally closed switch remains open.

3. A self-deenergizing control device for controlling energization of electrical load circuit comprising an electrically energized time delay device, means including switch means connecting said time delay device and said load means to a source of electric power, electrically energized switch operating means, said time delay device being connected in circuit with said switch operating means to actuate said switch operating means a given period of time from the beginning of the timing cycle to operate said switch means and thereby deenergize said time delay device, reset means operable with said switch means adapted to reset said time delay circuit to zero time when said switch means is opened and to disable said time delay circuit during the time said switch means remains open and adapted to enable said time delay circuit to restart the timing operation thereof from zero when said switch means is again closed, and at least one switch having a given normal position for controlling the energizing circuit of an electric power consuming instrumentality, reset means operable with said last named switch connected to said time delay device to reset the timing cycle of said delay device upon operation of said last named switch and to disable the timing operation of said delay device for the period of time said last named switch remains operated.

4. A time delay circuit for controlling the energization of an electrical power consuming device comprising a power switch, a current-responsive device for operating the power switch, a gas discharge device having an anode, a cathode and a control electrode, said current responsive device being connected in the anode-cathode circuit of said discharge device, a resistance-capacitance charging circuit, a D. C. source of current connected across said resistance-capacitance circuit, said capacitance being connected across said cathode and grid electrodes to apply a control voltage thereacross, a plurality of electrical power consuming instrumentalities, and switching means in circuit with each of said instrumentalities for controlling the energization thereof, each of said switching means including contact means for establishing, when the associated switching means is operated, a discharge circuit for said capacitor to thereby disable said charging circuit for the time such switching means remains operated and to reset said charging circuit.

5. In combination, a plurality of electrical loads, a self-deenergizing control device for controlling energization of said loads comprising a time delay circuit, a power switch connecting said time delay circuit and said loads to a source of electric power, current-responsive switch operating means operatively connected to said power switch, a current-controlling device having a control electrode, in circuit with said current-responsive means, said current-controlling device being responsive to a voltage above a predetermined value applied to said control electrode for causing said current-responsive means to operate to open said switch means, said time delay circuit including a resistance-capacitance combination, means for applying the voltage across the capacitance of said combination to said electrode of said current-controlling device, said current-controlling device being actuated a given period of time after the beginning of the charging cycle of said resistance-capacitance combination to thereby deenergize said time delay circuit and said loads, switch means for controlling the operation of at least one of said plurality of load means, said last named switch means including a pair of normally open contacts connected in shunt with said capacitance to close upon said last named switch being operated for discharging said capacitance to reset the timing cycle of said resistance-capacitance combination to zero time and for maintaining said capacitance discharged for the period of time said last named switch means remains operated.

6. In a self-deenergizing, electrically energized time delay device the combination of an alternating current circuit, means energized by said alternating current circuit for developing a direct current source, a load circuit, a gas-filled electron discharge device having an anode, a cathode and a control electrode, a current-responsive relay having an energizing winding, the anode-cathode circuit of said discharge device being connected in series relation with said energizing winding of said relay to said direct current source, a resistance, a capacitance in series with said resistance to form a resistance-capacitance timing circuit having a predetermined time constant, a connection between the control electrode of said discharge device and a portion of said resistance for impressing on said control grid an exponentially increasing positive potential with respect to the cathode maintaining said discharge device nonconductive for a period of time corresponding to said predetermined time constant, a plurality of contacts controlled by said current-responsive relay including normally closed contacts connected in series relation with said alternating current circuit and normally open contacts connected in shunt relation with said timing capacitance, switch means having a plurality of contacts connected in series relation in said load circuit for selectively operating portions thereof, and normally open contacts in shunt relation with said timing capacitance, said discharge device when rendered conductive by said timing circuit energizing said current-responsive relay to open said closed contacts in said alternating current circuit to effect deenergization of said device and to close said normally open capacitance shunting contacts associated with said relay to discharge said timing capacitance.

7. In combination, an electric motor, a time delay circuit having a predetermined timing cycle, a power switch, electromagnetic switch operating means, said power switch connecting, when closed, said motor, said time delay circuit and said switch operating means in parallel to a source of energizing power, said power switch operating means including a control element, said time delay circuit being connected to said control element to apply an operating potential thereto to cause said switch operating means to operate a predetermined period of time from the beginning of the timing cycle thereof to open said power switch and deenergize said motor, said time delay circuit and said switch operating means, electrically energizable clutch means for connecting said motor to a load driven therefrom, a normally open switch for energizing said clutch means, said last named switch including a pair of contacts, operable therewith for resetting said time delay circuit to zero time when said normally open switch is closed and for disabling the timing operation of said delay circuit for the time period said normally open switch remains closed, further electrically energizable clutch means for connecting said motor to a load, a normally closed switch for maintaining said further clutch means energized, said last named switch including a pair of contacts operable therewith for resetting said time delay circuit to zero when said normally closed switch is opened and for disabling the timing operation of said delay circuit for the time period said normally closed switch remains open.

8. In combination, a motor, a control device for controlling energization of said motor comprising an electrically energized time delay device, switch means for connecting said time delay device and said motor to a source of electric power, electromagnetic switch operating means, said time delay device being connected in circuit with said switch operating means to actuate said switch operating means a given period of time from the beginning of the timing cycle to operate said switch means and thereby deenergize said time delay device and said motor, reset means operable with said switch means adapted to reset said time delay circuit to zero time when said switch means is opened and to disable said time delay circuit during the time said switch means remains open and to enable said time delay circuit to restart the timing operation thereof from zero when said switch means is again closed electrically energizable clutch means for connecting said motor to a load driven thereby and at least one switch having a given normal position for controlling the energization of said clutch means, reset means operable with said last named switch connected to said time delay device to reset the timing cycle of said delay device upon operation of said last named switch and to disable the timing operation of said delay device for the period of time said last named switch remains operated.

9. In combination, an electrical motor, a time delay circuit having a predetermined timing cycle, switch means connecting said time delay circuit and said motor in parallel to a source of electric power, electrically energizable clutch means for coupling said motor to a load, electromagnetic switch operating means operatively connected to said switch means, said time delay circuit being connected in circuit with said switch operating means to energize said switch operating means a given period of time after the beginning of the timing cycle to thereby deenergize said time delay circuit and said motor, and further switch means for controlling the operation of said clutch means, said last named switch means including reset means operable therewith for resetting the timing cycle of said time delay circuit to zero time and for disabling said time delay circuit for the period of time said last named switch means remains operated.

10. A control circuit for deenergizing an electrically energized device when a second device coupled to said electrically energized device ceases to operate comprising switch means connected to said electrically energized device for establishing, when closed, an electrical path thereto, electromagnetic switch operating means for operating said switch means, a time delay circuit connected in circuit with said switch operating means and having a predetermined timing cycle for opening said switch means a predetermined period of time after the start of the timing cycle, and reset means associated with the second device and responsive to off-on changes in said second device for resetting the time delay circuit means to zero time when said second device commences to operate and disabling said time delay circuit means for the period of time said second device continues to operate.

References Cited in the file of this patent

UNITED STATES PATENTS

| | | |
|---|---|---|
| 1,937,869 | Brown | Dec. 5, 1933 |
| 1,939,609 | Minkler | Dec. 12, 1933 |
| 2,061,011 | Vingerhoets | Nov. 17, 1936 |
| 2,339,750 | Bartholy | Jan. 25, 1944 |
| 2,482,397 | Blankmeyer | Sept. 20, 1949 |
| 2,536,548 | Hazeu | Jan. 2, 1951 |
| 2,650,301 | Farmer | Aug. 25, 1953 |